United States Patent
Schmalenberg et al.

(10) Patent No.: US 11,579,272 B2
(45) Date of Patent: Feb. 14, 2023

(54) METHOD AND REFLECT ARRAY FOR ALIGNMENT CALIBRATION OF FREQUENCY MODULATED LIDAR SYSTEMS

(71) Applicant: TOYOTA MOTOR ENGINEERING & MANUFACTURING NORTH AMERICA, INC., Plano, TX (US)

(72) Inventors: Paul D. Schmalenberg, Ann Arbor, MI (US); Sean P. Rodrigues, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 49 days.

(21) Appl. No.: 15/929,197

(22) Filed: Dec. 23, 2019

(65) Prior Publication Data
US 2021/0190926 A1    Jun. 24, 2021

(51) Int. Cl.
*G01S 7/00* (2006.01)
*G01S 7/497* (2006.01)
*G01S 17/931* (2020.01)

(52) U.S. Cl.
CPC .......... *G01S 7/4972* (2013.01); *G01S 17/931* (2020.01)

(58) Field of Classification Search
USPC ...................................................... 356/4.01
See application file for complete search history.

(56) References Cited

U.S. PATENT DOCUMENTS

| 6,418,775 | B1 | 6/2002 | Säger et al. |
| 7,064,817 | B1 | 6/2006 | Schmitt et al. |
| 7,180,607 | B2 | 2/2007 | Kyle et al. |
| 7,280,931 | B1 * | 10/2007 | Kim ................ G05B 19/4184 702/81 |
| 8,497,981 | B2 | 7/2013 | Mahajan |
| 8,615,345 | B2 * | 12/2013 | MacNeille ........ G01C 21/3453 701/36 |
| 9,541,633 | B2 * | 1/2017 | Rybski ............... B64C 39/024 |

(Continued)

FOREIGN PATENT DOCUMENTS

| CN | 1005004285 B | 10/2017 |
| JP | 2000-206243 | 7/2000 |

*Primary Examiner* — James R Hulka
(74) *Attorney, Agent, or Firm* — Oblon, McClelland, Maier & Neustadt, L.L.P.

(57) ABSTRACT

A method and apparatus is provided to calibrate a LiDAR using a reflect array calibration target having a spatially varying spectral reflectance profile. A frequency modulated continuous wave LiDAR emits a beam that spans a range of wavelengths, and, therefore, spatially varying spectral features in the reflectance profile can be used as indicia of where the LiDAR beam hits the calibration target. For example, the center has one absorption wavelength and the periphery has another, such that alignment is achieved by changing the alignment direction to maximize the spectral feature at the one absorption wavelength while minimizing the spectral feature at the other absorption wavelength. Alternatively, at least one spectral feature can have a center wavelength that changes as a function of space. Thus, the LiDAR is aligned by changing the beam direction to shift the center wavelength to a value corresponding to the target center.

18 Claims, 10 Drawing Sheets

(56) References Cited

U.S. PATENT DOCUMENTS

| | | | |
|---|---|---|---|
| 9,933,515 B2* | 4/2018 | Prokhorov | G01S 7/4972 |
| 9,945,938 B2 | 4/2018 | Markendorf | |
| 10,302,746 B2 | 5/2019 | O'Keeffe | |
| 10,747,236 B2* | 8/2020 | Peasgood | B64C 19/00 |
| 2010/0235129 A1* | 9/2010 | Sharma | G01S 7/4972 |
| | | | 702/97 |
| 2012/0277952 A1* | 11/2012 | MacNeille | G01C 21/3453 |
| | | | 701/36 |
| 2014/0368493 A1* | 12/2014 | Rogan | G06K 9/00201 |
| | | | 345/419 |
| 2015/0286340 A1* | 10/2015 | Send | G06K 9/741 |
| | | | 345/175 |
| 2016/0161602 A1* | 6/2016 | Prokhorov | G01S 7/4026 |
| | | | 702/97 |
| 2016/0245899 A1* | 8/2016 | Rybski | G01S 7/4004 |
| 2018/0024571 A1* | 1/2018 | Peasgood | B64C 39/02 |
| | | | 244/7 C |
| 2018/0284240 A1* | 10/2018 | LaChapelle | G01S 17/42 |
| 2018/0284274 A1* | 10/2018 | LaChapelle | G01S 17/08 |
| 2018/0284280 A1* | 10/2018 | Eichenholz | G02B 27/0955 |
| 2019/0018121 A1 | 1/2019 | Sayyah et al. | |
| 2019/0094347 A1* | 3/2019 | Singh | G01S 17/931 |
| 2019/0204425 A1* | 7/2019 | Abari | G01S 17/931 |
| 2019/0265714 A1* | 8/2019 | Ball | G05D 1/024 |
| 2019/0301852 A1* | 10/2019 | Nobayashi | G01B 11/2545 |
| 2020/0099893 A1* | 3/2020 | Prall | G06K 9/00805 |
| 2020/0284887 A1* | 9/2020 | Wachter | G01S 7/4817 |

\* cited by examiner

METHOD AND REFLECT ARRAY FOR ALIGNMENT CALIBRATION OF FREQUENCY MODULATED LIDAR SYSTEMS

FIELD

The illustrative embodiments described herein relate to a calibration target for LiDAR alignment, and, more particularly, to the calibration target having a spectral reflectance profile that varies as a function of position, such that the spectral signature of the return signal from the target provide information regarding how to calibrate and/or correct the alignment of the LiDAR.

BACKGROUND

Like in radar, a LiDAR system can scan and monitor a surrounding environment to perform detection and ranging, except LiDAR uses shorter wavelength electromagnetic radiation than radar. LiDAR is an important technology for collision avoidance and for self-driving cars. To provide reliable information, the LiDAR should be aligned or calibrated to the axis of the car. For amplitude modulated continuous wave (AMCW) LiDAR, this alignment calibration can be performed using a target that includes one or more retroreflectors and a charge-coupled device (CCD) sensor. For example, using a high-precision retroreflector together with a CCD camera, a laser beam reflects off of the retroreflector directly back at the laser source. While the retroreflector may return laser beam back to the CCD camera, the illumination intensity on the conical/crosshairs of the image will not be even unless the system is perfectly aligned. Using beam steering technology, the feedback of the retroreflected spot relative to the crosshairs enables the system to be calibrated.

Although the above procedure and calibration target can be used for frequency modulated continuous wave (FMCW) LiDAR, differences between AMCW LiDAR and FMCW LiDAR allow for an improved calibration target and process for the alignment/calibration of the beam direction in FMCW LiDAR systems.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

SUMMARY

Figure 1:
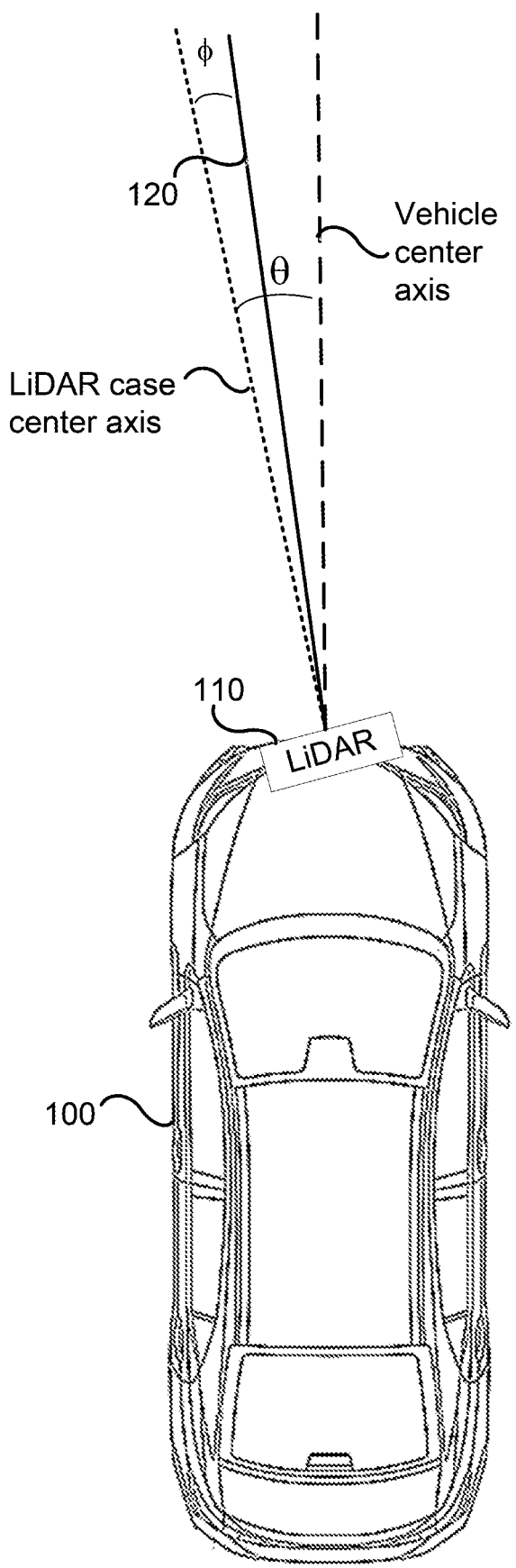
FIG. 1 shows a schematic diagram relating a beam direction of the LiDAR system to center axes of a LiDAR case and a vehicle, according to one implementation.

According to aspects of one embodiment, there is provided a calibration target for calibrating a pointing direction of a LiDAR that transmits radiation over a predefined wavelength interval. The calibration target includes a reflective surface having a reflectance profile that includes one or more spectral features that vary as a function of position along the reflective surface, the one or more spectral features being within the predefined wavelength interval.

According to aspects of another embodiment, there is provided a method of calibrating an alignment of a LiDAR. The method includes: (i) illuminating a spot on a calibration target using a radiation beam of a LiDAR, the calibration target comprising a reflective surface having a reflectance profile having a reflectance profile that includes one or more spectral features that vary as a function of position along the reflective surface, the one or more spectral features being within a predefined wavelength interval; (ii) receiving a reflected signal from the radiation beam at the spot on the calibration target as a wavelength of the radiation beam is scanned over a predefined wavelength range spanning the two or more spectral features to generate a reflectance profile; (iii) correcting, based on the generated reflectance profile, an alignment of the LiDAR; and (iv) updating a calibration table based on the estimated position.

According to aspects of a third embodiment, there is provided a method of calibrating an alignment of a LiDAR. The method includes: (i) illuminating a spot on a calibration target using a radiation beam of a LiDAR, the calibration target comprising a reflective surface having a reflectance profile having a reflectance profile that includes one or more spectral features that vary as a function of position along the reflective surface, the one or more spectral features being within a predefined wavelength interval; (ii) receiving a reflected signal from the radiation beam at the spot on the calibration target as a wavelength of the radiation beam is scanned over a predefined wavelength range spanning the two or more spectral features to generate a reflectance profile; (iii) estimating, based on the generated reflectance profile, a position of the spot on the calibration target; and (iv) updating a calibration table based on the estimated position.

DETAILED DESCRIPTION

LiDAR can provide detection and ranging by transmitting electromagnetic radiation and detecting a back scattered/reflected signal. The reflected/return signal can include diffuse reflection, specular reflection, or both. In a moving vehicle, for example, LiDAR can be used to detect the presence of a vehicle traveling in an adjacent lane of traffic, and provide warnings or collision avoidance measures to improve safety. Further, LiDAR can play an important role is self-driving cars by provider detection and ranging that enable an autonomous vehicle to monitor the surrounding environment and react to changes therein. These applications benefit from the LiDAR being aligned and/or calibrated to a predefined direction with respect to a reference frame of the vehicle. This alignment can deteriorate and drift over time or can be disturbed when the vehicle undergoes a collision. When the LiDAR becomes misaligned, a calibration target can be used to realign/recalibrate the LiDAR with respect to the vehicle.

For calibration targets that are designed to be used to calibrate the alignment of an amplitude modulated continuous wave (AMCW) LiDAR, there is little benefit in the calibration target having a wavelength dependent reflectance profile because the AMCW LiDAR emits radiation at a single wavelength. In contrast, a frequency modulated continuous wave (FMCW) LiDAR emits radiation spanning a range of wavelengths. This fact can be used to improve the calibration targets used with a FMCW LiDAR to enable a faster and better alignment process. Accordingly, the methods and apparatuses described herein use calibration targets having a spectral feature (e.g., an absorption resonance/dip) that varies as a function of position along the calibration target to provide information regarding where the LiDAR beam is hitting the target, which provides guidance regarding how to align/calibrate the LiDAR.

Using a calibration target with a spatially varying spectral reflectance profile has several advantages. For example, retroreflector-based alignment calibration is limited to identifying alignment issues over long distances, requiring the insertion of an additional path length in order to calibrate systems like a car LiDAR. Further, retroreflector based alignment uses a CCD detector, but many LiDAR systems use photodetector rather than a CCD detector. By using a calibration target and calibration process that does not require a CCD detector, the calibration is simplified and is compatible with a wider range of LiDAR systems.

Referring now to the drawings, wherein like reference numerals designate identical or corresponding parts throughout the several views, FIG. 1 shows a schematic diagram of a LiDAR 110 mounted on a motor vehicle 100. The LiDAR 110 is arranged in a case that is mounted on a vehicle 100. To translate the positions of objects detected by the LiDAR 110 from the reference frame of the LiDAR 110 into the reference frame of the vehicle 100, the angles θ and φ are used. Here, the angle θ is the angle between the center axis of the vehicle 100 and a center axis of a case in which the LiDAR 110 is arranged, and φ is the angle between the center axis of the LiDAR case and a beam direction 120 of the LiDAR 110. For example the LiDAR 110 can sweep the beam angle φ through a range of angles and record the reflection signal for each value of φ to create a map of the position of objects within the angles swept out during the LiDAR scan. Calibration tables representing the relative orientations of the respective center axes and beam direction can be used to relate/translate the positions of objects detected in the LiDAR reference frame into the vehicle reference frame. To account for changes in the relative alignments among the respective center axes and the LiDAR beam direction, periodic alignment calibrations can be performed using the reflect array disclosed herein to realign the beam and/or update the calibration tables.

For many laser beam steering applications, the beam steering device (e.g., a LiDAR with a mirror galvo-scanner) may be mounted onto a larger piece of equipment (e.g., a motor vehicle) without the beam steering device being aligned to the axis of the larger piece of equipment. Here, the non-limiting example of the LiDAR 110 being mounted on the vehicle 100 is used to illustrate this, but the concepts disclosed herein are not limited to the case of a LiDAR mounted on a vehicle. Variations with respect to the beam steering device and the larger piece of equipment on which the beam steering device is mounted are contemplated as being within the scope of this disclosure. Here, the concepts are explained using the non-limiting example of the LiDAR 110 mounted onto the vehicle 100, where the LiDAR boresight is off axis to the vehicle centerline by an angle θ. The LiDAR 110 detects objects in the surrounding environment, and generates a map of the positions of the detected objects. To map the positions of the detected objects with respect to the vehicle 100, a calibration is performed to determine the angle θ.

In certain implementations, the LiDAR 110 is aligned during installation, but over time the LiDAR 110 drift away from proper alignment. For example, although the LiDAR 110 may be initially aligned during installation, the LiDAR 110 may fall out of alignment due to everyday usage and driving of the vehicle 100 or due to a minor collision, altering the alignment of the LiDAR 110.

Furthermore, during operation the angle θ may change due to environmental and other forces. For example, the LiDAR 110 can be mounted to a case, and the case can shift over time with respect to the frame of the vehicle 100. Additionally, the laser beam pointing direction with respect to the LiDAR case may change due to temperature variations, device aging, or other reasons.

Figure 2A:
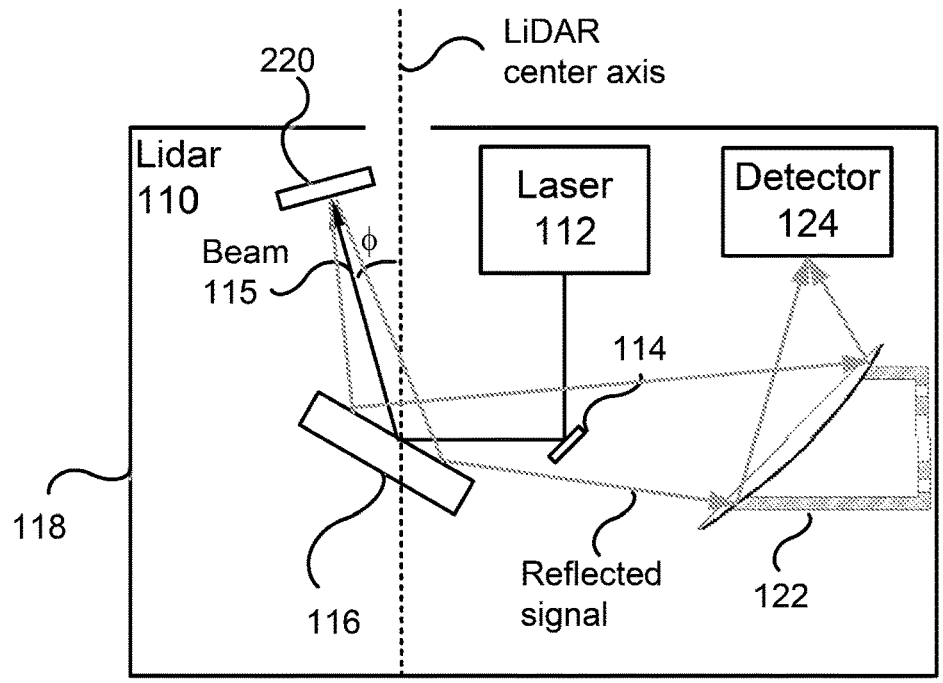
FIG. 2A shows a diagram of a calibration target fixed to a case of the LiDAR, according to one implementation.
Figure 2B:
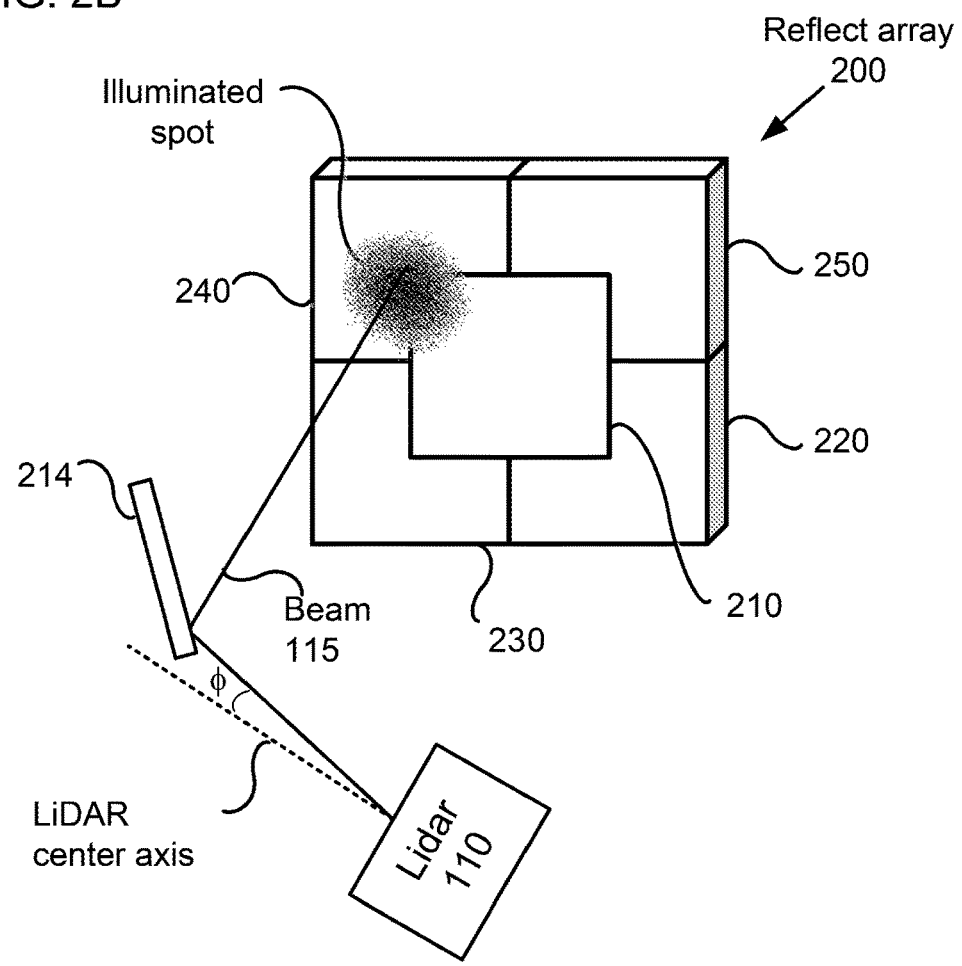
FIG. 2B shows a diagram of a calibration target fixed outside of the LiDAR to a vehicle itself, according to one implementation.

FIGS. 2A and 2B show schematic diagrams in which a beam-steering optic 116 steers the beam away from the bore site and onto a reflect array 200 in order to perform a pointing calibration. In FIG. 2A, the reflect array 200 is attached to the LiDAR case 118 to detect how the beam pointing changes relative to the center axis of the LiDAR case 118.

In FIG. 2B, the reflect array 200 is attached to the vehicle 100 to detect how the beam pointing changes relative to the center axis of the vehicle 100. In certain implementations, the system can include two reflect arrays 200: one reflect array 200 attached to the case 118, which houses the LiDAR 110, and another reflect array 200 attached to a body of the vehicle 100. Thus, changes can be detected and calibrated for the pointing direction relative both relative to the case 118 of the LiDAR 110 and relative to the vehicle 100.

In FIG. 2A, the LiDAR 110 includes a laser 112 that directs a light beam 115 onto a mirror 114 and then onto a beam-steering optic 116. The beam-steering optic 116 can be a scanning galvo mirror, a micro-electro mechanical systems (MEMS) steerable mirror, a piezo-electric crystal actuated mirror, an acousto-optic modulator, or other optic capable of changing the direction of the beam 115. Additionally, beam steering can be performed using a phased array method, or any other method of beam steering that controls and manipulates the pointing direction of a LiDAR beam. The reflected signal for the reflect array 200 is collected by a receiver optic 122 (e.g., an off-axis parabolic reflector) and focused to a detector 124 (e.g., a photodetector) that measures the reflected signal. When the laser transmits a frequency modulated signal in which the center frequency is scanned as a function of time, the signal measured by the detector 124 provides a spectral profile of the spot on the reflect array 200 that is illuminated by the beam 115.

In FIG. 2B, the beam-steering optic 116 steers the beam 115 on to a pick-off mirror 214 outside of the LiDAR 110, and the pick-off mirror 214 directs the beam 115 onto a reflect array 200 that is fixed to a frame of the vehicles 100. The reflect array 200 is shown having several zones 210-250, including a center zone 210, a bottom right (BR) zone 220, a bottom left (BL) zone 230, a top left zone 240, and a top right zone 250. In FIG. 2B, the illuminated spot from the beam 115 is shown overlapping part of the center zone 210 and part of the TL zone 240. The reflected signal from the reflect array 200 will partially be from both the center zone 210 and the TL zone 240. Accordingly, if the two zones have different spectral reflectance signatures, the ratio between the part of the beam 115 on the center zone 210 and the part of the beam 115 on the TL zone 240 can be determined based on the relative magnitudes of the different spectral reflectance signatures present in the reflected signal. That is, the spectral profile of the reflected signal can be used to determine where the spot is on the reflect array 200. This position information can then be used to update the calibration tables relating the beam angle to the center axes of the case 118 and/or the vehicle 100. Thus, the method of calibrating the pointing direction of the LiDAR 110 can be simplified using as the calibration target a reflect array 200 having a spatially varying spectral reflectance profile.

Figure 3:
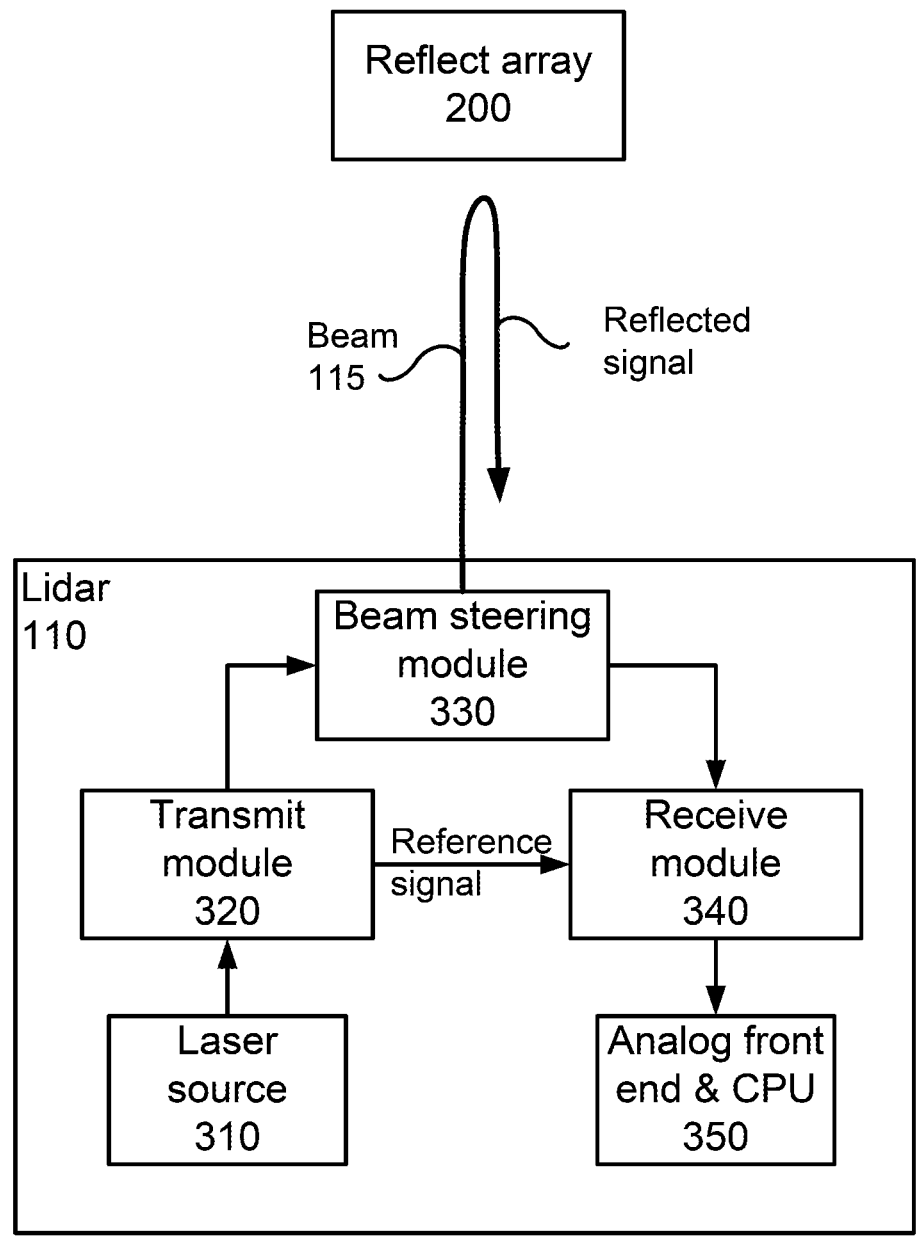
FIG. 3 shows a block diagram of a LiDAR system, according to one implementation.

FIG. 3 shows a block diagram of another implementation of the LiDAR system 110 measuring a reflected signal from the reflect array 200. A laser source 310 generates the radiation of the beam 115. A transmit module 320 modifies the beam 115 to prepare the beam to be transmitted. The transmit module 320 diverts part of the beam to the receive module as a reference signal (e.g., to perform heterodyne detection for ranging when the beam 115 is frequency modulated). Next, a beam steering module 330 controls the deflection angle of the beam 115 (e.g., to sweep the beam 115 through a predefined range of angles). The beam-steering module 330 can includes, e.g., the beam-steering optic 116 to control the deflection angle φ. The beam 115 is transmitted from the beam steering module 330 to the reflect array 200, and part of the beam 115 is reflected as a reflected signal. The magnitude of the reflected signal at a given time depends on the frequency of the frequency modulated (FM) beam 115 and the reflectance profile the spot of the reflect array 200 being illuminated. Over the period of the frequency modulation, the magnitude of the reflected signal will trace out a curve representing the spectral reflectance profile of the illuminated spot. The reflected signal is received by the beam-steering module 330 and directed to the receive module 340. The receive module 340 converts the reflected signal into an analog electrical signal, which is then sent to an analog front end and central processing unit (CPU) 350. For example, the analog front end converts the analog electrical signal to a digital signal, and the CPU processes the digital signal to determine the angles θ and φ, which are used to update the calibration tables for the pointing direction of the beam 115.

The CPU can include processing circuitry configured to perform method 800, which is described below with reference to FIG. 8. For example, the CPU can include a processor coupled to (i) an internal memory, (ii) a display, and (iii) a removable memory unit. A CPU can be, for example, an ARM architecture CPU such as the Cortex A53 by ARM Inc. or a Snapdragon 810 by Qualcomm, Inc. The CPU can also be an Intel Atom CPU by Intel Corporation.

The analog front end and CPU 350 can also include a GPS device for position sensing and/or inertial navigation. The GPS device can be coupled to the processor and used for determining time and location coordinates of the LiDAR 110.

The CPU can be any programmable microprocessor, microcomputer or multiple processor chip or chips that can be configured by software instructions (applications) to perform a variety of functions, including functions of various embodiments described herein. The CPU can include multiple processors.

Software applications can be stored in the internal memory before they are accessed and loaded into the CPU. The CPU can include or have access to the internal memory sufficient to store the software instructions. The internal memory can also include an operating system (OS). The internal memory can also include a beam direction calibration application that preforms, among other things, parts of the method 800.

Additionally, the internal memory can be a volatile or nonvolatile memory, such as flash memory, or a mixture of both. For the purposes of this description, a general reference to memory refers to all memory accessible by the CPU, including internal memory, removable memory plugged into the LiDAR 110, and memory within the CPU itself, including a secure memory.

The LiDAR 110 can also include an input/output (I/O) bus to receive and transmit signals to peripheral devices and sensors, or to communicate with embedded processors of the vehicle 100.

Returning to FIG. 2B, the reflect array 200 is illustrated using the non-limiting example of having five discrete zones. In general, the number of zones can be more or less than five. Different zones have different reflectance profiles as a function of frequency. Alternatively, in certain implementations, the reflectance profile can continuously vary as a function of position on the reflect array 200. The case of discrete zones is discussed here, and the alternative of continuously varying reflectance profiles is discussed below.

Figure 4A:
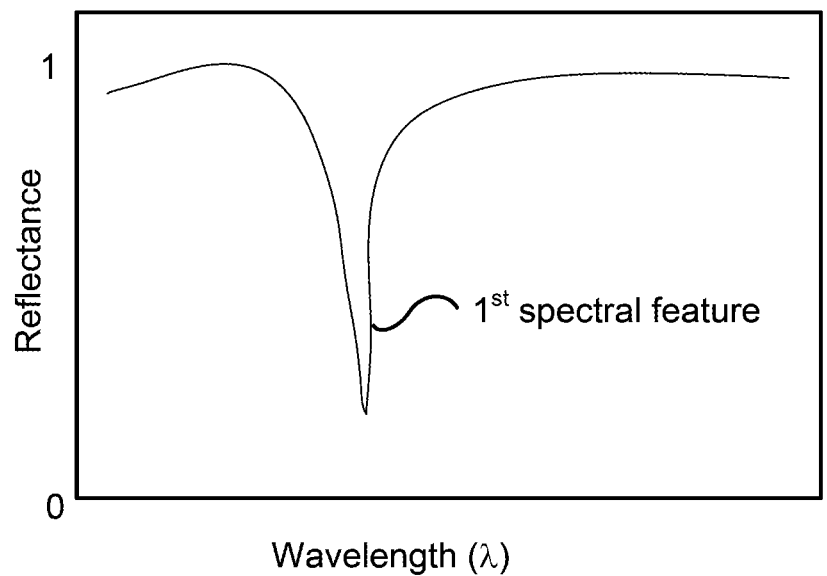
FIG. 4A shows a plot of a reflectance profile as a function of wavelength for a point on the calibration target within a center zone, according to one implementation.
Figure 4B:
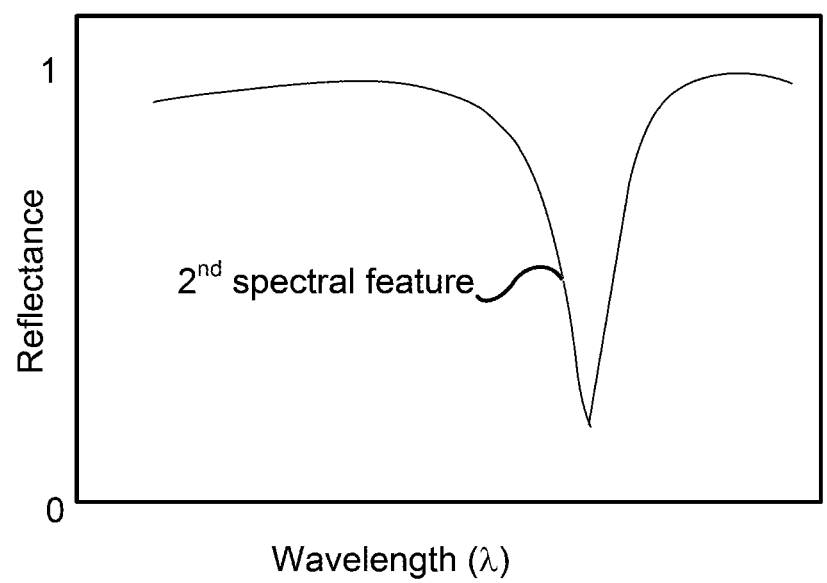
FIG. 4B shows a plot of a reflectance profile as a function of wavelength for a point on the calibration target within a top left zone, according to one implementation.
Figure 5A:
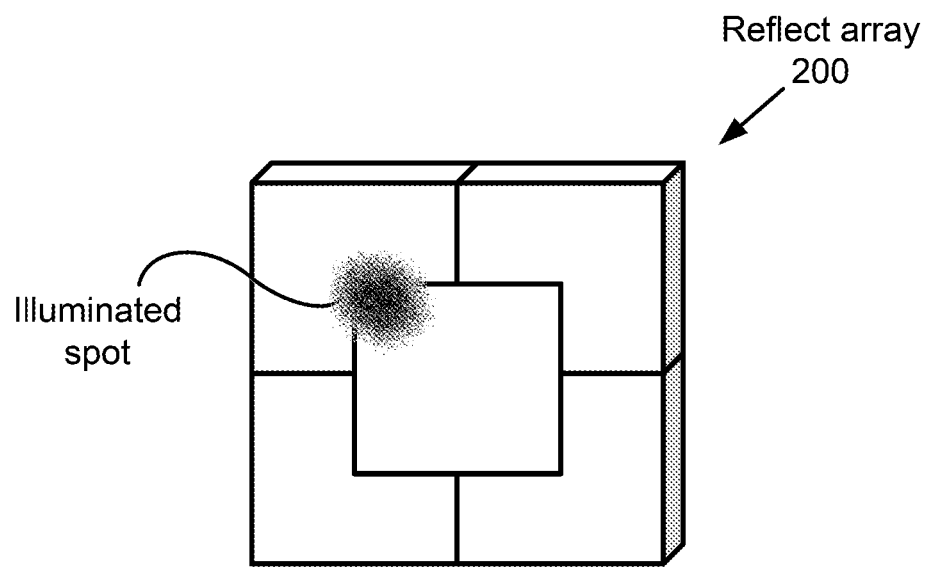
FIG. 5A shows a diagram of a spot being illuminated on the calibration target between the center zone and the top left zone, according to one implementation.
Figure 5B:
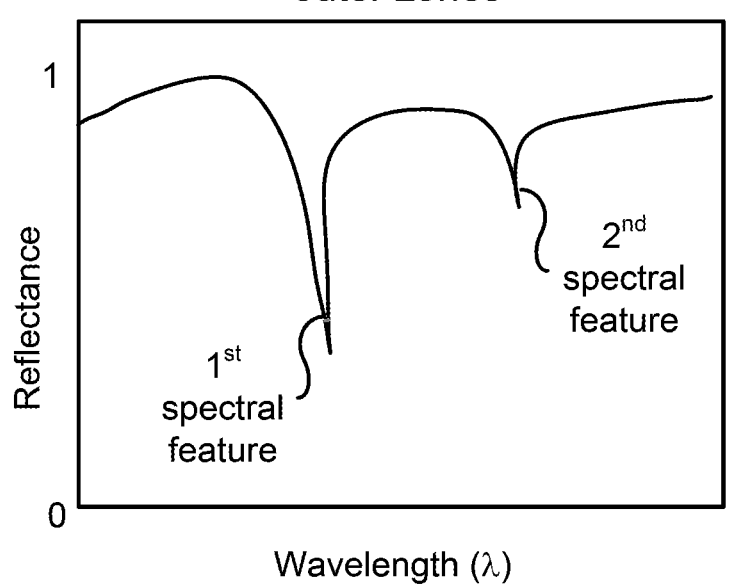
FIG. 5B shows a plot of a reflectance profile as a function of wavelength for an illuminated spot between the center zone and the top left zone, as shown in FIG. 4C, according to one implementation.

FIG. 4A shows a reflectance profile as a function of wavelength for the center zone 210, and FIG. 4B shows a reflectance profile as a function of wavelength for the TL zone 240. When the beam 115 illuminates the spot shown in FIG. 5A, the reflectance profile of the reflected beam will have the reflectance profile shown in FIG. 5B, which is a superposition/combination of the reflectance profiles shown in FIGS. 4A and 4B. That is, the first spectral feature from the center zone reflectance profile (e.g., an absorption resonance at a first wavelength) and the second spectral feature from the TL zone reflectance profile are combined (e.g., an absorption resonance at a second wavelength). The relative position of the illuminated spot with respect to the two zones can be determined based on the relative magnitudes of the two spectral features. For example, when the first spectral feature becomes larger and the second spectral feature becomes smaller the spot is shifted from the TL zone towards the center zone. Thus, the position of the illuminated spot relative to the respective zones can be estimated from the reflectance spectrum of the reflected signal.

By using multiple zones having different/unique spectral features and having areas on the order of the spot size illuminated by the LiDAR 110, the position of the beam 115 on the reflect array 200 can be determined from the spectral response of the reflected signal.

Accordingly, in one implementation, to calculate the angle φ or θ, the laser beam is steered temporarily for the purpose of calibration on to the reflect array 200. The reflect array 200 has discrete zones where the reflectance over frequency is different in each zone. The LiDAR 110 scans over wavelength and thereby generates the reflectance profile as a function of wavelength for the spot on the reflect array 200 currently being illuminated. Once the reflectance profile is generated, the position of the laser beam on the reflect array 200 can be estimated from the generated reflectance profile.

In certain implementations, the estimated position is used as feedback to align the laser, e.g., by steering/changing the laser beam until it is aligned with the center zone. After which calibration tables can be updated.

In other implementations, the calibration tables can be updated directly from the estimated position.

Figure 6A:
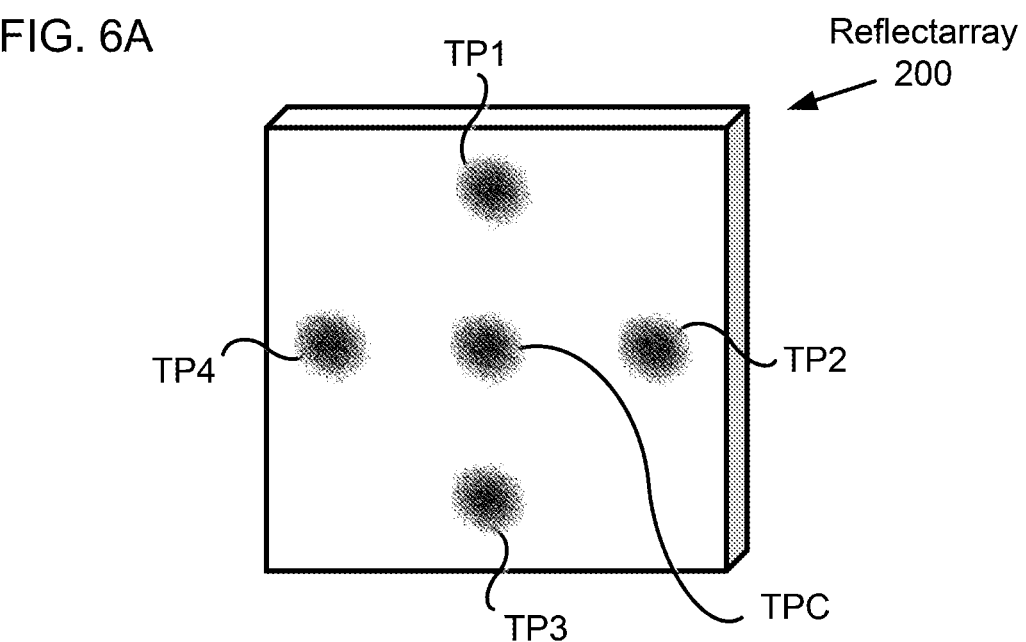
FIG. 6A shows a diagram of an illuminated spot at five test points, according to one implementation.
Figure 6B:
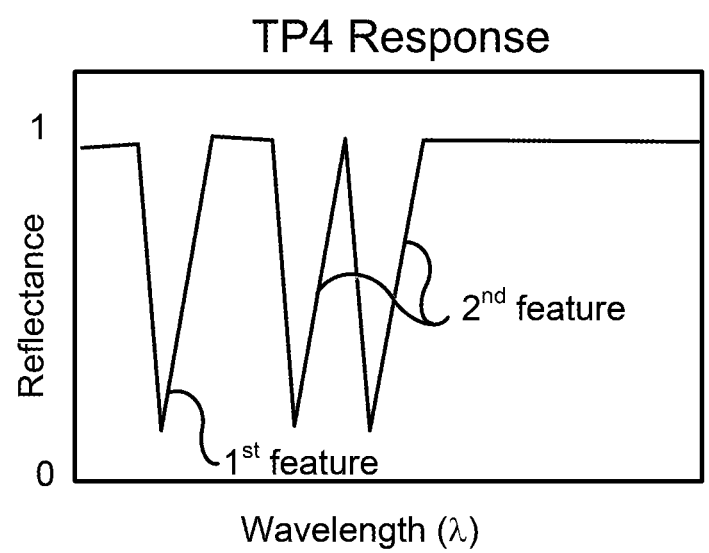
FIG. 6B shows an example of a reflectance profile at test point 4 (TP4), according to one implementation.
Figure 6C:
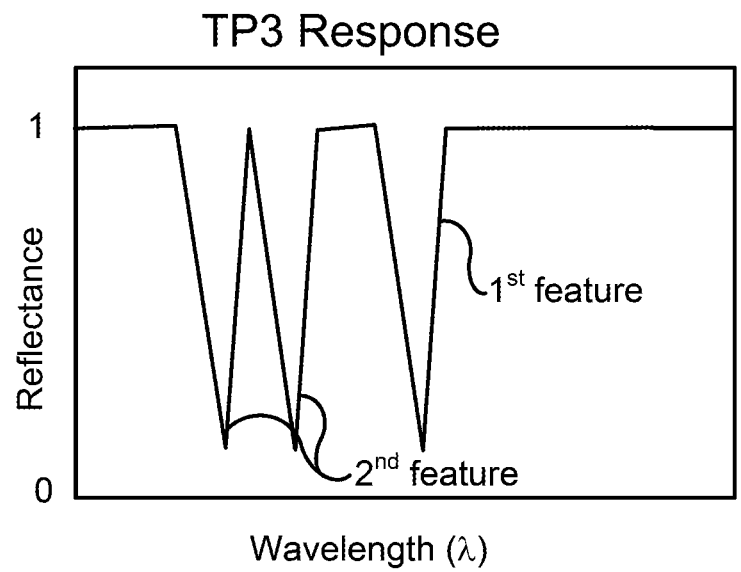
FIG. 6C shows an example of a reflectance profile at test point 3 (TP3), according to one implementation.

Now a non-limiting example of a reflect array 200 with continuously varying spectral features is illustrated. FIG. 6A shows a reflect array 200 with spots illustrated at five test points represented as test point center (TPC), test point one (TP1), test point two (TP2), test point three (TP3), and test point four (TP4). FIGS. 6B-6F show the reflectance profiles corresponding to these five test points. In FIG. 6B, two spectral features are shown: a first feature, which is a single resonance dip, and a second feature, which is a double resonance dip. In this non-limiting example, the position of the spot with respect to the vertical direction is indicated by the wavelength of the double resonance dip (i.e., the second feature), and the horizontal direction of the spot on the reflect array 200 is indicated by the wavelength of a single resonance dip (i.e., the first feature). When the spot is at the TPC, the single resonance dip aligns to the middle of the double resonance dip, creating a triple resonance dip.

In this non-limiting example, the second feature varies continuously as a function of position in the vertical direction, and the first spectral feature varies continuously as a function of position in the horizontal direction. Because TP4, TPC, and TP2 are all at the same position with respect to the vertical axis, FIGS. 6B, 6E, and 6F show the second feature as being at constant wavelength. The test positions TP4, TPC, and TP2 are different with respect to the horizontal position, resulting in the first feature being at a lower wavelength for TP4 when the spot is on the left side of the reflect array 200. The first feature is at a higher wavelength for TP2, when the spot is on the right side of the reflect array 200, and the first feature is at the center wavelength when the spot is at TPC. Thus, the horizontal alignment can be guided to by monitoring the wavelength of the first feature.

Figure 6D:
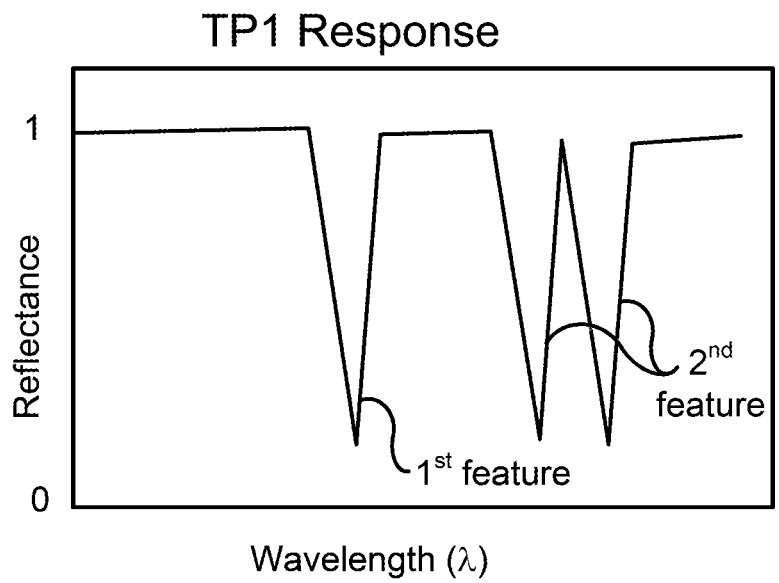
FIG. 6D shows an example of a reflectance profile at test point 1 (TP1), according to one implementation.
Figure 6E:
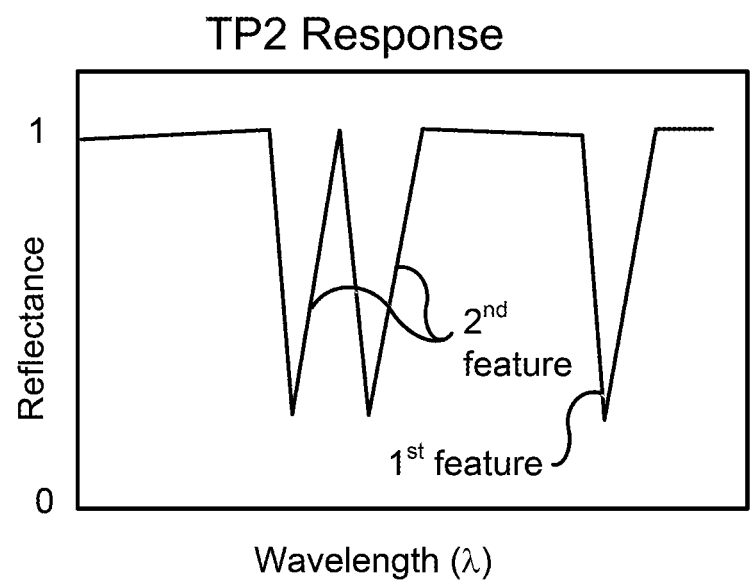
FIG. 6E shows an example of a reflectance profile at test point 2 (TP2), according to one implementation.
Figure 6F:
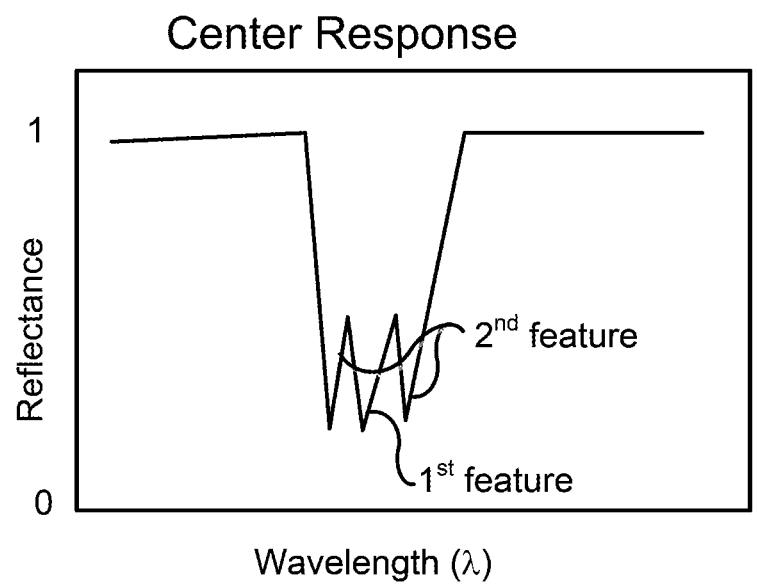
FIG. 6F shows an example of a reflectance profile at test point center (TPC), according to one implementation.

Similarly, FIGS. 6D-6F show that the second feature varies in the vertical direction, such that for test point TP1 the second feature is at a higher wavelength, and for test point TP3 the second feature is at a lower wavelength. Thus, the vertical alignment can be guided to by monitoring the wavelength of the second feature.

In this non-limiting example, the wavelength of the second feature varies with respect to the vertical position, and the wavelength of the first feature varies with respect to the horizontal position. However, other variations could be used. For example, the vertical and horizontal directions may use completely separated wavelength zones so that the resonance dips do not interact. Further, the wavelength need not vary linearly with position, but can be some other function of position. Additionally, the spectral features are illustrated with wavelength being the parameter that is varied as a function of position, but other parameters of the spectral features can be varied to indicate position. For example, the width, depth, or quantity of the spectral features can be used as parameters to provide indicia of position.

Here, the center frequency of the spectral features is used because it provides a straightforward example to illustrate the principle. This example is straightforward because tuning/changing a center frequency of an absorption resonance can be performed using various fabrication methods, such as varying the thickness of layers in a dielectric stack (e.g., a dielectric mirror or etalon), varying the size, shape, or other dimensions of nanoparticles (e.g., changing the diameter of micro and nano spheres to change the Mie resonance), varying the size and shape of surface plasmon structures, varying the size and shape of quantum wells and dots, and various fabrication methods for a metamaterial.

Figure 7A:
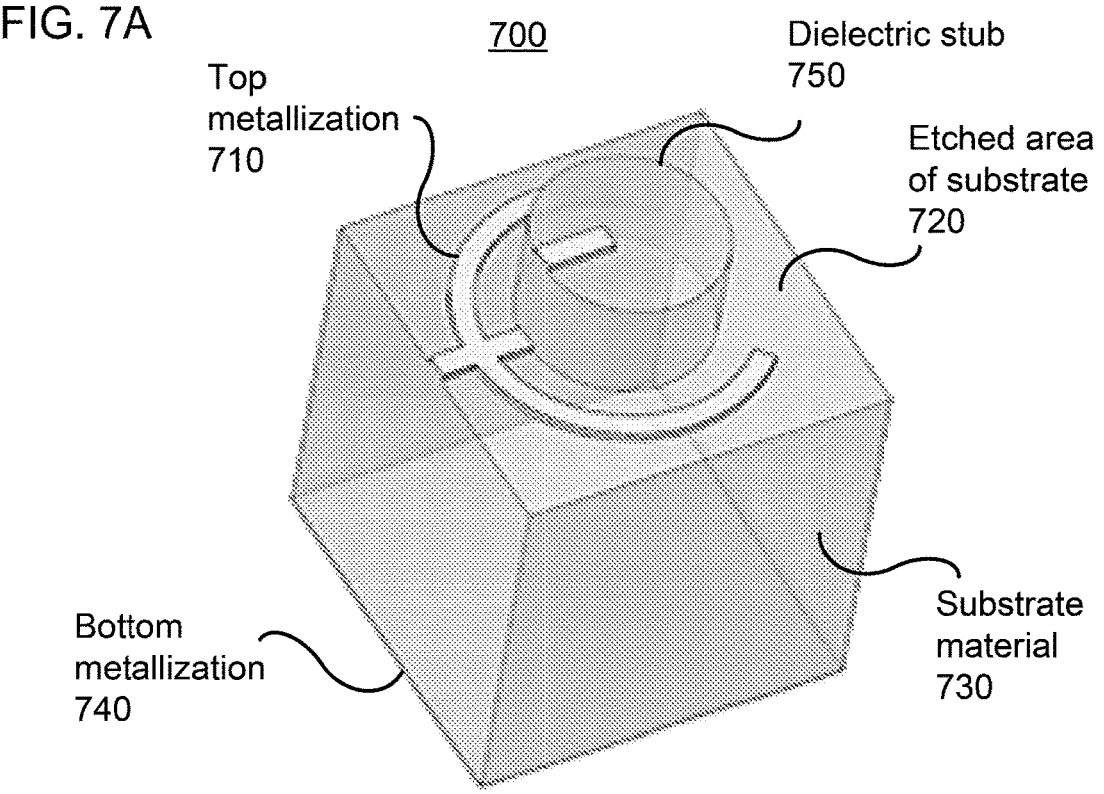
FIG. 7A shows a perspective view of a unit cell of a metamaterial surface, according to one implementation.
Figure 7B:
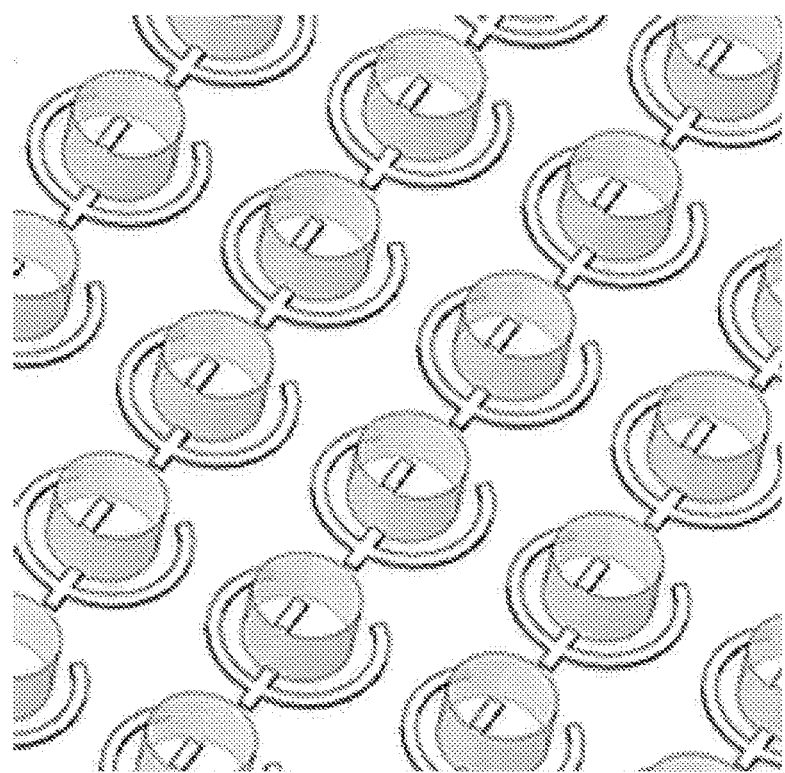
FIG. 7B shows a perspective view of a two-dimensional array of cells in a metamaterial surface, according to one implementation.

FIGS. 7A and 7B show an example of using a metamaterial to provide the spectral features of the reflect array 200. To create a reflector with one or more spatially varying spectral features, a metamaterial surface (referred to herein as a "metasurface") can be used. FIG. 7A shows an example of a unit cell for a metasurface 700. In FIG. 7A, a bottom metallization layer 740 and a top metallization layer 710 are provided on a dielectric substrate 730. The shapes of the etched area of the substrate 720 and top metallization layer 710 can control the reflectance profile. For example, in FIG. 7A, the unit cell includes a dielectric stub 750 created by etching the substrate 730, the diameter and height of the dielectric stub 750 can be changed to control the wavelength of an absorption resonance dip. Further, the shape of the dielectric stub 750 may be a circle, square, or any topology selected through an optimization process. Additionally, the wavelength and shape of a spectral feature can be controlled through changing the shape and/or dimensions of the structure of the top metallization layer 710. The substrate material 730 can be a dielectric such as SiO2. The substrate material 730 can be an insulator, polymer, glass, ceramic, intrinsic semiconductor, or other suitable material for a metasurface. The metallization can be a metal such as Gold, or can be a suitable conductor (e.g., a conducting ceramic such as indium tin oxide (ITO) or a highly doped semiconductor). The size of the unit cell can be on the same order of magnitude as the wavelength used by the LiDAR 110.

FIG. 7B shows a metasurface made of an array of unit cells. To achieve a continuously varying wavelength for the spectral features, a parameter of the unit cells (e.g., the diameter of the dielectric stub 750) can be varied across the array of unit cells. Further, to realize two different spectral features, unit cells with different parameters corresponding to the respective different spectral features and be intermixed or interleaved.

Figure 8:
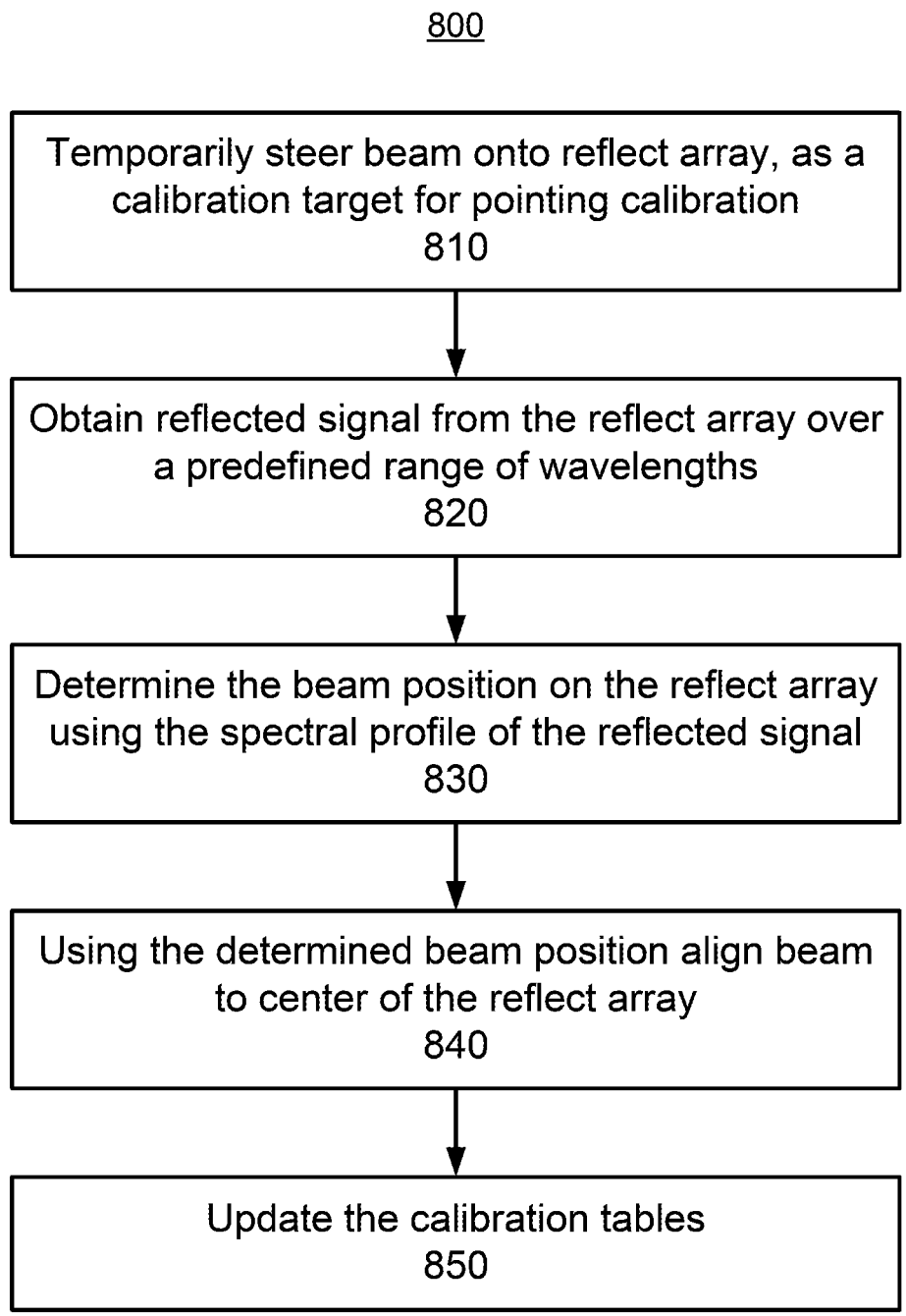
FIG. 8 shows a flow diagram of a method that uses a calibration target with spatially varying reflectance profile to calibrate or align a beam direction of a LiDAR, according to one implementation.

FIG. 8 shows a flow diagram of a method 800 for calibrating a pointing direction of a LiDAR 110. In step 810, the beam of the LiDAR 110 is steered onto the reflect array 200 to initiate the calibration procedure. After the calibration procedure, the beam will be steered back to a point where it can be used to scan the environment to perform detection and ranging.

In step 820, a reflected signal is obtained from the reflect array 200. The reflected signal is obtained over a predefined range of wavelengths in order to generate a spectral reflectance profile. The spectral features of this reflectance profile will have parameters (e.g., center wavelength of an absorption dip) that indicate where the beam is hitting on the reflect array 200. To obtain the reflectance profile, the LiDAR 110 can be a FMCW LiDAR, and the wavelength of the LiDAR 110 can be modulated over the predefined range of wavelengths.

In step 830, the parameters of the spectral features in the spectral profile of the reflected signal are used to determine the beam position on the reflect array 200, as discussed above.

In step 840, misalignments in the pointing direction of the LiDAR 110 are corrected based on the determined beam position. For example, using the determined beam position from step 830, the beam 115 can be aligned to the center of the reflect array 200. In certain implementations, this step can be omitted. For example, to relate the reference frame of the LiDAR 110 to the reference frame of the vehicle 100, it is sufficient to know the offset angle between the two references frames without necessarily correcting the pointing direction for misalignment.

In step 850, the calibration tables are corrected based on the results of the previous steps.

While certain implementations have been described, these implementations have been presented by way of example only, and are not intended to limit the teachings of this disclosure. Indeed, the novel methods, apparatuses and systems described herein may be embodied in a variety of other forms; furthermore, various omissions, substitutions and changes in the form of the methods, apparatuses and systems described herein may be made without departing from the spirit of this disclosure.

Obviously, numerous modifications and variations of the present invention are possible in light of the above teachings. It is therefore to be understood that within the scope of the appended claims, the invention may be practiced otherwise than as specifically described herein.

The invention claimed is:

1. A calibration target system for calibrating a pointing direction of a frequency modulated continuous wave (FMCW) LiDAR that transmits radiation spanning a predefined wavelength interval, the calibration target comprising:
    a first reflective surface disposed separately from the FMCW LiDAR and having a reflectance profile that includes one or more spectral features that vary as a function of position along the first reflective surface, the one or more spectral features being wavelength dependent in order to reflect wavelengths within the predefined wavelength interval differently, and
    a second reflective surface disposed on a case of the FMCW LiDAR and having a reflective profile that includes one or more spectral features that vary as a function of position along the second reflective surface.

2. The calibration target system according to claim 1, wherein the first reflective surface is arranged as a plurality zones, and in each zone of the plurality zones a value of a parameter of the one or more spectral features differs with respect to values of the parameter in adjacent zones of the plurality zones.

3. The calibration target system according to claim 2, wherein a center wavelength of an absorption dip is the parameter of the one or more spectral features of the first reflective surface that differs with respect to the adjacent zones.

4. The calibration target system according to claim 2, wherein
    the plurality of zones includes a center zone and two or more peripheral zones, and
    center wavelengths of the one or more spectral features in the center zone are different than center wavelengths of the one or more spectral features in the peripheral zones.

5. The calibration target system according to claim 4, wherein the center zone is adjacent to the peripheral zones, such that, when the FMCW LiDAR illuminates a spot on the calibration target that partially includes both the center zone, which has a first reflectance profile, and one of the peripheral zones, which has a second reflectance profile, a reflected signal from the calibration target includes a combination of the first reflectance profile and the second reflectance profile.

6. The calibration target system according to claim 5, wherein a ratio between how much of the spot is in the center zone relative to the one of the peripheral zones is represented by the combination of the first reflectance profile and the second reflectance profile of the reflected signal.

7. The calibration target system according to claim 2, wherein a first spectral feature of the one or more spectral features of the first surface has a center wavelength, and the center wavelength is a discrete value for each of the plurality zones with each zone having a different center wavelength relative to remaining zones of the plurality zones, such that the center wavelength varies discontinuously as the function of the position along the first reflective surface.

8. The calibration target system according to claim 1, wherein the one or more spectral features have a parameter that varies continuously as the function of the position along the first reflective surface, and a value of the parameter is determined by measuring a reflectance profile of a reflected signal from the first reflective surface.

9. The calibration target system according to claim 8, wherein a center wavelength of an absorption dip is the parameter of the one or more spectral features that varies continuously as the function of the position along the first reflective surface.

10. The calibration target system according to claim 8, wherein the one or more spectral features includes a first spectral feature that varies as a function of position in a first direction.

11. The calibration target system according to claim 10, wherein the one or more spectral features includes a second spectral feature that varies as a function of position in a second direction, which is different from the first direction.

12. The calibration target system according to claim 11, wherein the first spectral feature is a single absorption dip and the second spectral feature is a double absorption dip.

13. The calibration target system according to claim 11, wherein the first spectral feature and the second spectral feature can be distinguished one from the other based on respective shapes of the first spectral feature and the second spectral feature.

14. The calibration target system according to claim 1, wherein at least one of the first reflective surface and the second reflective surface comprises a metamaterial having an array of cells, each cell of the array of cells being tuned to absorb radiation at a predefined wavelength, which is a function of position along the reflective surface.

15. The calibration target system according to claim 14, wherein each of the cells includes a top metallization structure on one surface of a corresponding substrate and includes a bottom metallization layer arranged on another, opposite surface of the substrate.

16. The calibration target system according to claim 15, wherein a shape or size of part of the top metallization structure is changed as the function of the position along the at least one of the first and second reflective surfaces thereby changing the predefined wavelength of the cells as the function of the position along the at least one of the first and second reflective surfaces.

17. The calibration target system according to claim 14, wherein each of the cells includes a dielectric member arranged on the surface of the substrate.

18. The calibration target system according to claim 17, wherein a dimension or shape of part of the dielectric member is changed as the function of the position along the at least one of the first and second reflective surfaces to change the predefined wavelength of the cells as the function of the position along the at least one of the first and second reflective surfaces.

* * * * *